(12) United States Patent
Koehler (10) Patent No.: US 9,421,677 B2
(45) Date of Patent: Aug. 23, 2016

(54) CRIMPING DEVICE FOR SECURING A FERRULE ONTO SAFETY CABLE

(71) Applicant: Robert Herbert Koehler, Secaucus, NJ (US)

(72) Inventor: Robert Herbert Koehler, Secaucus, NJ (US)

(73) Assignee: K Square Machine Works, LLC, Moonachie, NJ (US)

( * ) Notice: Subject to any disclaimer, the term of this patent is extended or adjusted under 35 U.S.C. 154(b) by 198 days.

(21) Appl. No.: 14/308,322

(22) Filed: Jun. 18, 2014

(65) Prior Publication Data

US 2015/0367488 A1 Dec. 24, 2015

(51) Int. Cl.
*B25B 27/14* (2006.01)
*F16B 17/00* (2006.01)

(52) U.S. Cl.
CPC ............. *B25B 27/146* (2013.01); *F16B 17/002* (2013.01); *Y10T 29/49909* (2015.01); *Y10T 29/539* (2015.01)

(58) Field of Classification Search
CPC ..... F16B 39/20; F16B 17/002; B65B 13/025; Y10T 29/53987; Y10T 29/53952; Y10T 29/49946
See application file for complete search history.

(56) References Cited

U.S. PATENT DOCUMENTS

| | | | |
|---|---|---|---|
| 3,732,715 A * | 5/1973 | Zamorano | B21C 23/22 29/282 |
| 5,052,094 A | 10/1991 | Plasse | |
| 5,127,144 A | 7/1992 | Plasse | |
| 5,152,043 A * | 10/1992 | Plasse | B25B 23/00 29/252 |
| 5,167,059 A | 12/1992 | Plasse | |
| 5,199,146 A * | 4/1993 | Grover | B25B 23/0092 29/268 |
| 5,214,832 A | 6/1993 | Koehler | |
| 5,230,129 A | 7/1993 | Scruggs | |
| 5,305,511 A | 4/1994 | Koehler | |
| 5,345,663 A | 9/1994 | Scruggs | |
| 5,361,475 A | 11/1994 | Scruggs | |
| 7,059,362 B2 * | 6/2006 | Koons | B21F 15/00 140/123.5 |

* cited by examiner

*Primary Examiner* — Jason L Vaughan
(74) *Attorney, Agent, or Firm* — Richard Malagiere, Esq.

(57) ABSTRACT

An adaptable device for tensioning safety cable to a predetermined tension limit, crimping a ferule onto the cable, cutting the excess cable and ejecting the device from the crimped ferrule-cable assembly. The device compromises a tool body, a cable tensioner and an elongated nose. The cable tensioner comprises a handle for applying tension to a cable inserted into the tension gripper mechanism and a one-way clutch to prohibit movement in a direction which would unwind the cable or lessen the tension applied. The elongated nose has a ferrule receiving aperture for receiving a ferrule and passing the safety cable there through. A plunger is reciprocally operative in the nose piece to crimp the ferrule onto the cable, cut the excess cable and eject the device from the crimped ferrule-cable assembly. The Plunger is actuated either manually or by means of an attached power assisted tool. The elongated nose piece is removable so it can be interfaced with different tool bodies.

6 Claims, 7 Drawing Sheets

FIG. 13C

CRIMPING DEVICE FOR SECURING A FERRULE ONTO SAFETY CABLE

FIELD OF INVENTION

The present invention relates to a device for attaching steel cable sometimes referred to as safety cable (or lock wire or wires) to releasable fasteners and, more particularly, to an adaptable device for tensioning, locking and terminating safety cable while simultaneously ejecting the device from the attached steel cable-fastener assembly.

BACKGROUND OF THE INVENTION

Various types of machinery are subject to vibration that can loosen nuts and bolts. Lock wire has long been used as protection to resist such loosening. Lock wire secures two or more elements together so that the loosening of one element is counteracted by the tensioned wire running through the elements. Most often in a lock wire configuration, two wire strands are wrapped together and then separated such that one strand goes through the bolt or nut head and the other strand goes around the bolt or nut head; the rejoined ends are twisted together, again, on the exiting side of the nut or bolt and so on. Once the wire strands have been inserted through and around all of the nuts or bolts in a particular grouping, the remaining free ends of the wire strands are secured by twisting the terminated ends of the wire strands together.

In large part in the area of machinery vibration, the lock wire method of grouping bolts together has been replaced with steel cable (also referred to as safety cable). Steel cable is made from an assembly of steel wire laid (or twisted) into a helix to produce a strong resilient material. Notwithstanding the strength of steel cable, the termination of a steel cable often results in ends which easily fray. Further, the resultant resiliency of the steel cable makes it difficult to secure the terminated ends by twisting the steel cable ends together. As such, the terminated ends of steel cable passed through holes in a series of nuts or bolts subject to operational vibration is usually secured by a ferrule crimped onto the free end of the cable to secure the cable to the assembly.

In this arrangement, it is often necessary to obtain a predetermined tension on the steel cable looped through the holes in a grouping of nuts and bolts before securing the free end of the steel cable with a ferrule and terminating the excess safety cable. Prior art devices use a pocket into which the ferrule sits where the crimping occurs. This arrangement often requires twisting or other manipulation by the operator to remove the device from the crimped cable-bolt assembly. This movement often compromises the pre-set tension limit on the crimped cable-bolt assembly. It is an object of the present invention to provide a device that allows tensioning of the steel cable to a predetermined limit, ferrule crimping, steel cable free end termination and ejection of the device from the crimped steel cable secured grouping of nuts or bolts without compromising the pre-set tension of the safety cable.

SUMMARY OF THE INVENTION

A device used for tensioning steel cable to a mechanically set limit (typically on a grouping of bolts on a machine subject to vibration) and crimping a ferrule onto the cable while simultaneously terminating the excess cable and ejecting the device from the crimped ferrule-steel cable assembly when the steel cable has been tensioned to the mechanically set tension limit. The device includes a manual actuator for gripping and pulling the steel cable to the desired tension limit. A mechanical configuration implemented for crimping the ferrule onto the steel cable when the tension limit has been reached. The mechanical configuration being operative to sever the free end of the steel cable and eject the device from the crimped ferrule-steel cable assembly concurrent with crimping the ferrule onto the terminated end of the steel cable.

DETAILED DESCRIPTION OF INVENTION

The Present invention will now be described in terms of the presently preferred embodiment thereof as illustrated in the drawings. Those of ordinary skill in the art will recognize that many obvious modifications may be made thereto without departing from the spirit or scope of the present invention.

Figure 1:
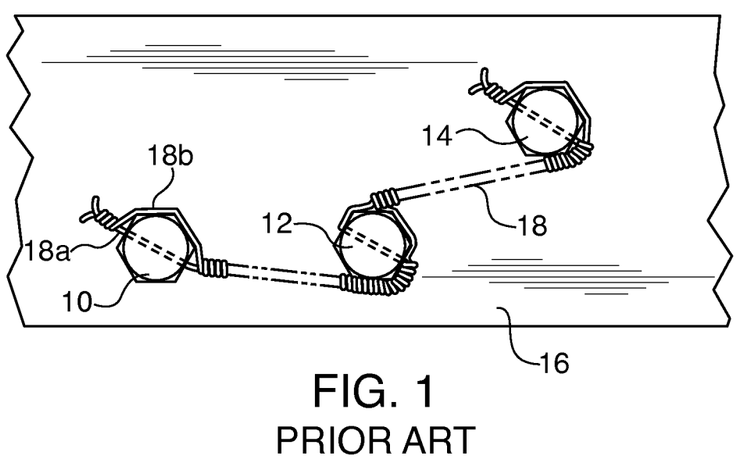
FIG. 1 is a top plan view of the prior art bolt head lock wire configuration.

A lock wire 18 applied in accordance with the prior art is illustrated in FIG. 1 wherein threaded fasteners 10, 12 and 14 are engaged with a portion 16 of a rotating apparatus (not otherwise shown). The lock wire 18 comprises two wire strands 18a and 18b twisted together at one end are separated such that strand 18a passes through a transverse opening in fastener 10 while strand 18b passes around the exterior of the fastener 10. The strands are twisted together on the opposite side of fastener 10 and, again, one strand passes through a transverse opening formed in fastener 12 while the other strand passes around fastener 12. The lock wire 18 continues until the last fastener, in this particular instance fastener 14, whereupon one strand passes through a transverse opening in the fastener, while the other strand passes around the exterior of the fastener. The strands are twisted together on the opposite side of the fastener 14.

Figure 2:
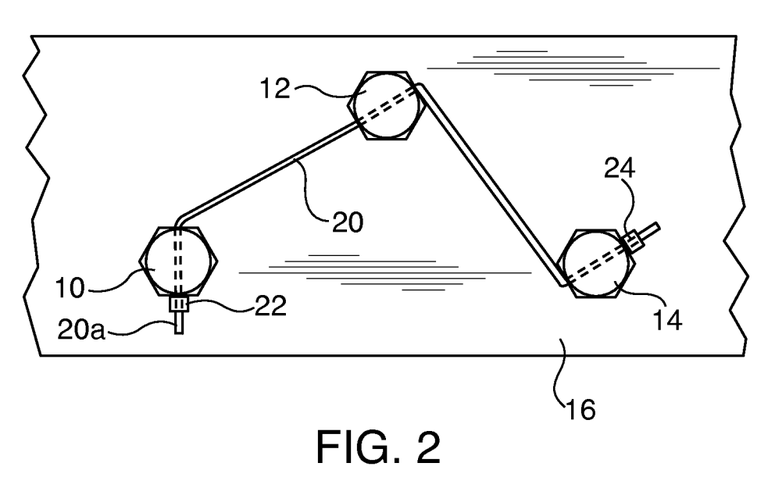
FIG. 2 is a top plan view of a safety cable system applied using the device according to the present invention.
Figure 3:
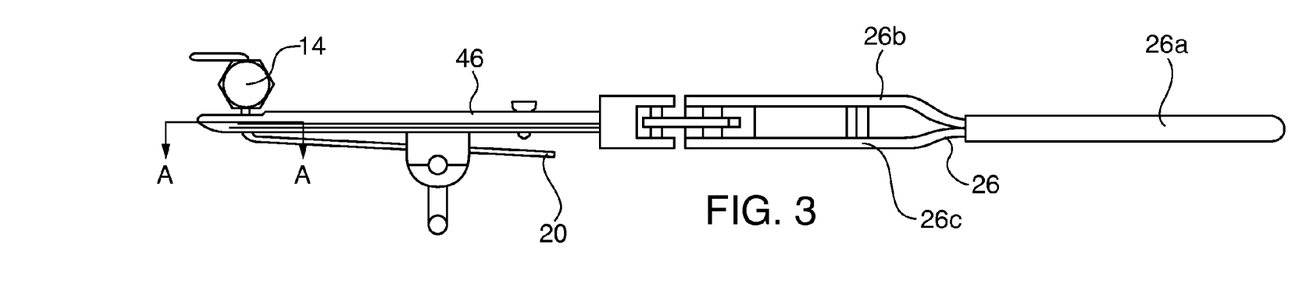
FIG. 3 is a top planar view of a device according to the present invention.

FIG. 2 illustrates a safety cable system applied using the apparatus according to the present invention. Threaded fasteners 10, 12 and 14 are once again engaged with the machinery portion 16. Safety cable 20 comprises a multi strand cable having a motion stop ferrule 22 affixed to end 20a. Safety cable 20 passes through transverse openings formed in the threaded fasteners 10, 12 and 14 until ferrule 22 bears against one side of fastener 10. At this point, ferrule 24 is inserted over the end of cable 20 against the side of fastener 14, a tension is applied to the safety cable 20 and the ferrule 24 is crimped onto the safety cable such that it bears against a side of the fastener 14 thereby securing the cable to the series of fasteners through which it is threaded. Safety cable 20 is then automatically trimmed. The pre-determined tension is maintained in safety cable 20 by the contact of ferrules 22 and 24 with the sides of the threaded fasteners 10 and 14, respectively.

Figure 5:
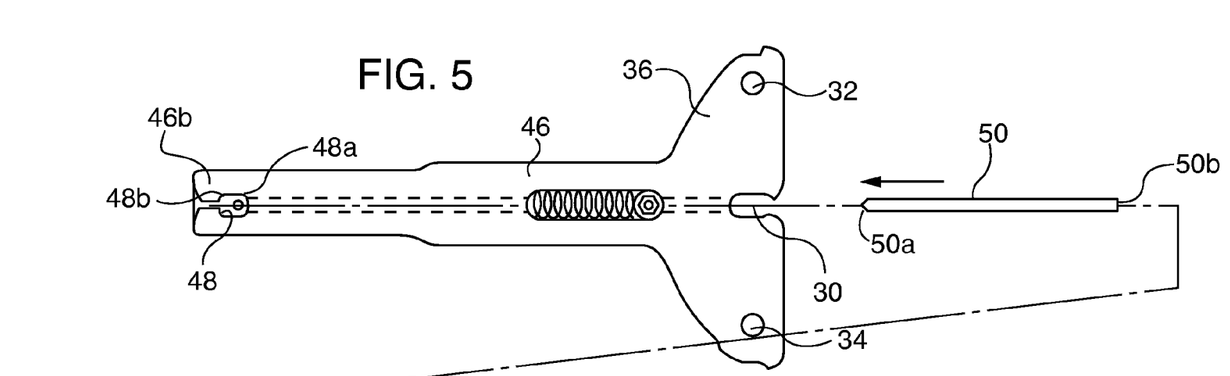
FIG. 5 is a side plan view of the nose portion of the device according to the present invention.
Figure 6:
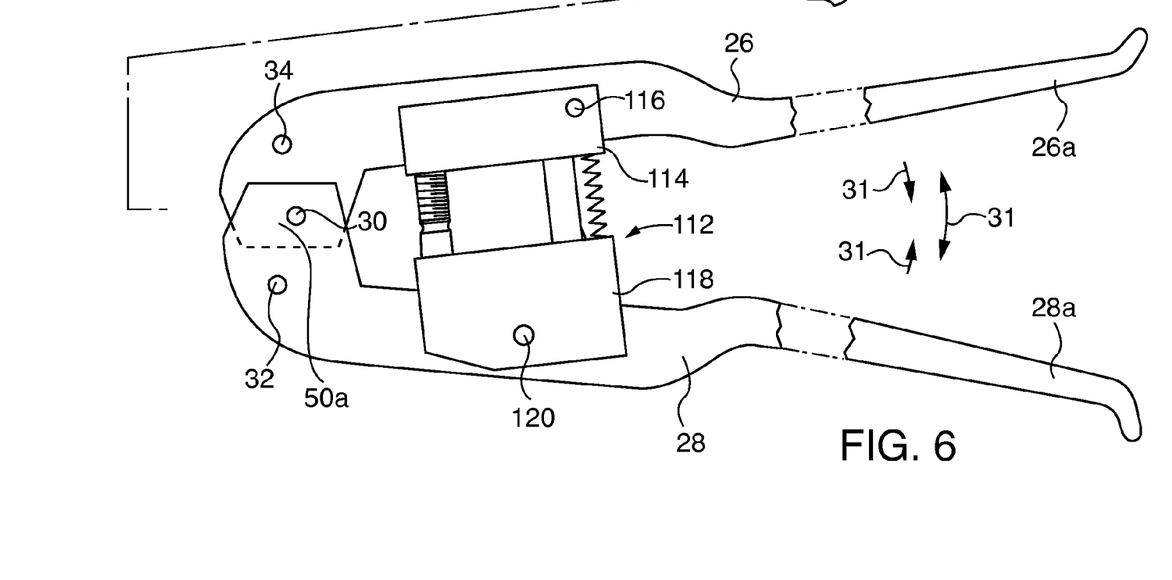
FIG. 6 is a side plan view of the tool body portion of the device according to the present invention.

As best illustrated in FIG. 5 & FIG. 6, the device according to the present invention comprises a pair of handle members 26 and 28 pivotally attached together via pivot pins 32 and 34 so as to pivot about the longitudinal axis of the pivot pins 32 and 34 toward and away from each other as illustrated by arrows 31. The handle members 26 and 28 may have cushioned or coated hand gripping areas 26a and 28a, respectively.

The elongated nose portion 46 (FIG. 5) is pivotally attached via pivot pins to handles 26 and 28 at location 32 and 34. Plunger 50 is captured in the inner cavity of 46 by a spring loaded set screw mechanism FIG. 5. The proximal end of Plunger 50 sits on the flat of pin 30 pivotally attached to handle members 26 and 28. Pin 30 engages 50b. See FIGS. 5 and 6.

Figure 4:
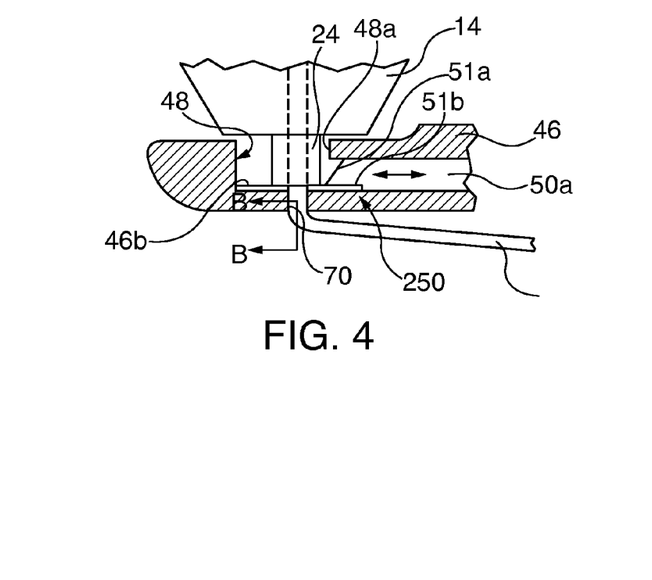
FIG. 4 is an enlarged partial cut away view along axis A-A of the tip portion of the device depicted in FIG. 3.
Figure 4A:
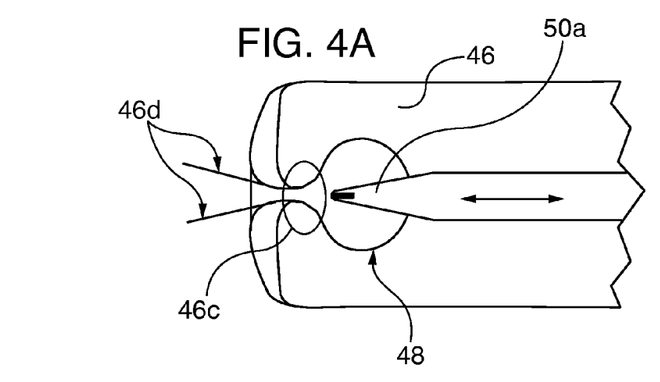
FIG. 4a is a partial enlarged top plan view of the tip portion of the device depicted in FIG. 5.
Figure 4B:
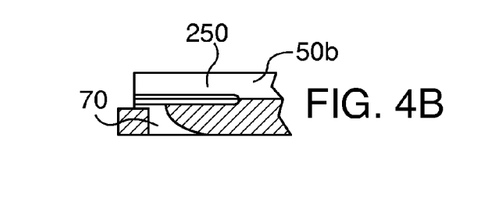
FIG. 4b is a cross-sectional view of the partial cut away view depicted in FIG. 4 taken along line B-B.

Elongated nose portion 46 also has a distal end portion 46b which includes a ferrule receiving opening 48, the outer most portion of which is open as illustrated in FIG. 5, the opening including a proximal end 46 adjacent punch driving member 50 and an opposed distal opening 46b. FIG. 5. Elongated nose portion 46 has a longitudinally extending, central opening which slidably accommodates crimping punch driving member 50. FIG. 5. Driving member 50 has an end 50a which sits on the flat portion of pin 30 which provides for it to be extended by manipulation of handle members 26 and 28 by pivot pins 32 and 34. As will be hereinafter explained in more detail, the driving member 50 is movable between a retracted position at which a crimping punch distal end 50a does not extend significantly into opening 48 and a crimping position at which punch 50a extends into the opening 48 effectively pushing through into the opening and forcing the ferrule through the opening 46c so as to crimp the ferrule onto a safety cable extending through the ferrule. FIG. 4A. As will be described below, a cable receiving aperture 70 extends into the bottom of opening 48. FIG. 4 and FIG. 4B.

In order to use the device according to the present invention, the safety cable must first be threaded through a ferrule as well as the aperture 70; a tension must be applied to the safety cable to a predetermined value; and the ferrule must be permanently crimped onto the safety cable.

The first portion of the operational procedure may be carried out with the assistance of a ferrule holding cartridge as is generally known to those of ordinary skill in the art. Generally, the ferrule holding member may have a magazine portion defining a storage chamber adapted to accommodate a plurality of ferrules 24.

Figure 7:
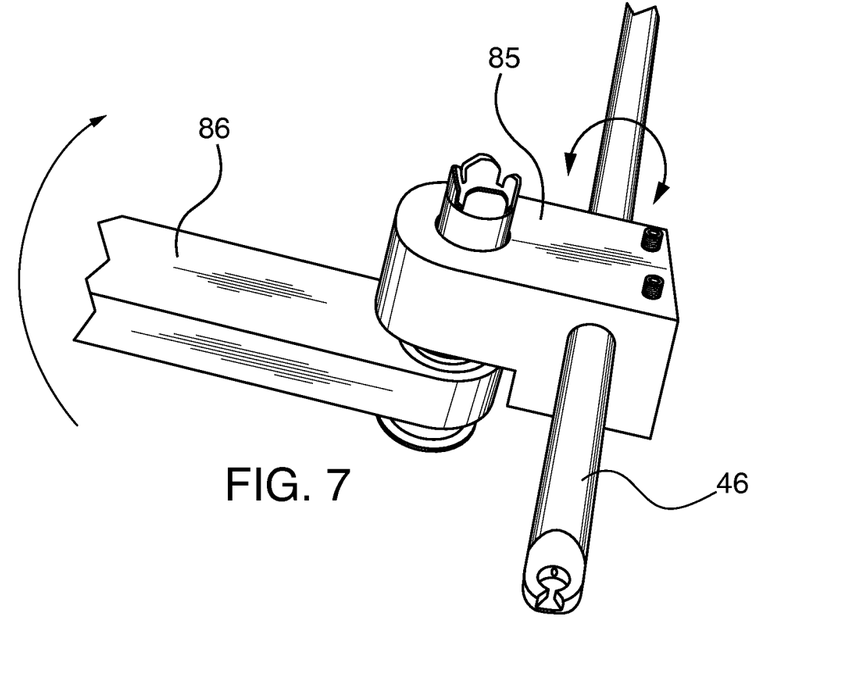
FIG. 7 is an isometric view of the tensioning assembly associated with the present invention.
Figure 8:
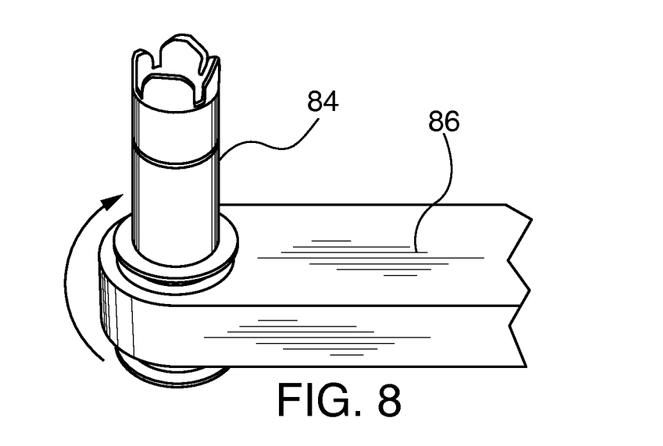
FIG. 8 is a planer view of the tension gripper shaft of the tensioning system associated with the present invention.
Figure 9:
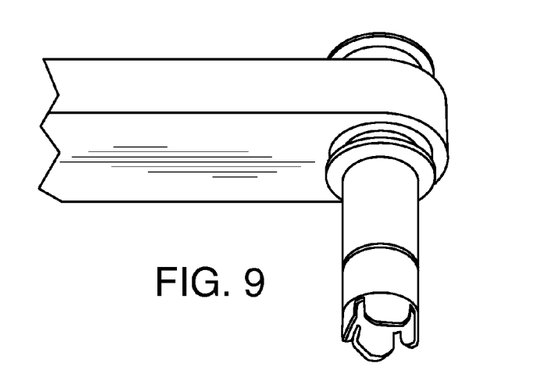
FIG. 9 is a side view of the tension gripper shaft of the tensioning system associated with the present invention.
Figure 10:
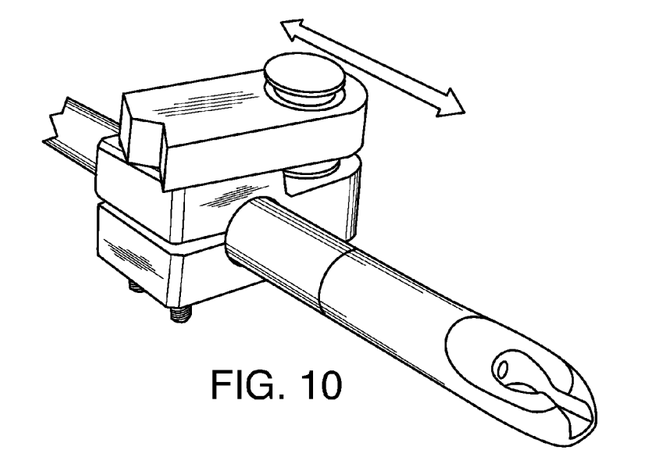
FIG. 10 is an isometric view of the tensioning mechanism housing associated with the present invention.
Figure 11:
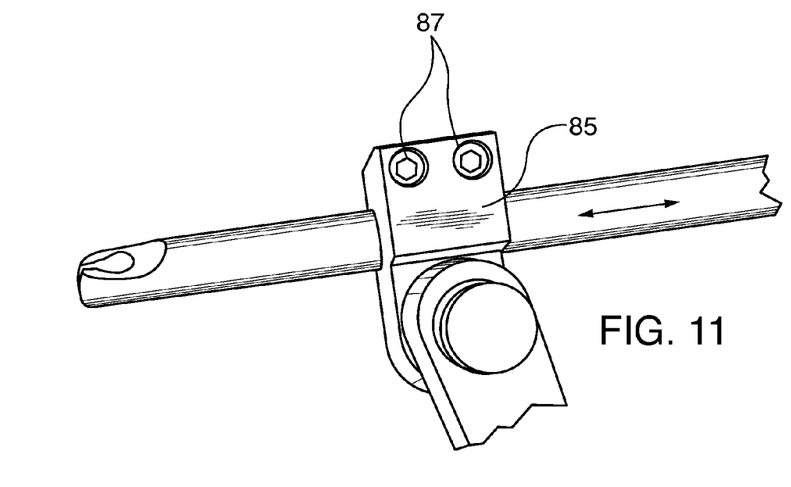
FIG. 11 is a side view of the tensioning mechanism housing associated with the present invention.

Once the desired amount of safety cable 20 has been pulled through the threaded member 14, the ferrule 24 and the nose portion 46, the ferrule holding member, if employed, is removed. At this point, it is necessary to apply a predetermined tension to the safety cable 20 before permanently attaching ferrule 24 to the cable by crimping. This is accomplished by attaching the end of safety cable 20 to a tensioning device, generally indicated in FIG. 7. The tensioning mechanism is illustrated in FIGS. 7-11. The tensioning mechanism according to the present invention comprises a one-way rotation mechanism, which may be any known, commercially available device. FIG. 8. The tension gripper shaft 84 has four slots so that the cable may be locked by being inserted into two of the slots in a 90 degree configuration. FIG. 8. The winding member 86 is attached to the tension gripper shaft by way of a one-way bearing press fit into a housing 85. FIG. 8. The winding member 86 will operate only in one direction so that it can only apply tension to the cable and cannot operate to loosen the cable once the cable is engaged onto the tension gripper shaft. FIG. 7 and FIG. 8. The winding member is rotated to apply tension to the cable. FIG. 7. When the desired tension is reached, the one way bearings in the tensioning mechanism prohibits the cable from unwinding from its tensioned position while the ferrule is crimped onto the cable. The winding mechanism is contained in a housing 85 with two set screws 87 which allow the entire tensioning mechanism to slide along the elongated nose piece. FIG. 10 and FIG. 11.

Once the proper tension has been applied to the safety cable 20, the ferrule 24 may be crimped onto the safety cable. This is achieved by manually urging handle members 26 and 28 towards each other. As illustrated in FIG. 6, such movement of the handle members 26 and 28 will cause pivot pins 32 and 34 to move around their respective axis points and thereby urging pin 30 against which crimping punch driver 50 sits at 50b. FIG. 5 and FIG. 6. Such movement causes relative movement between the nose portion 46 and the crimping punch driver 50. FIG. 5.

As best seen in FIGS. 4A and 6, moving the handles 26 and 28 towards each other will cause driver 50 to move toward the left with respect to nose portion 46 from the retracted position to the crimping position. As specifically shown if FIG. 4A, the extending motion of the crimp punch 50a, forces the ferrule-cable assembly through restriction 46d which deforms the ferrule 24 so as to be crimped and permanently attached to safety cable 20. The restriction 46d is defined by two flats 46c. The flats 46c initially engage the ferrule 24 as it is pushed through the restriction 46d in order to start the crimping process and reduce the stress experienced in the area of 46d. This process allows the ferrule 24 to be crimped to the cable 20 before the cable 20 is engaged by a cutting plate 250 shown in FIG. 4 and as described below. The nose piece 46 is plated with a material with a high Rockwell Hardness to facilitate the crimping function and to provide wear resistance, such as HRC 55-66. Specifically, as the ferrule 24 is pushed toward the distal end of 46, it is initially engaged by the two flats 46c at the entrance to the restriction 46d which deforms the outer ring of the ferrule 24, so that the ferrule 24 and the cable 20 running through it can be pushed through restriction 46d and thereby crimped and joined together. FIG. 4 and FIG. 4A.

The detail of the ferrule crimping portion of the tool is illustrated in FIGS. 4, 4A and 4B. The tip of the ferrule crimping punch 50a (that will come into contact with the ferrule when extended) is slightly angled to an edge at the portion of the tip of the crimping punch 51a in contact with the cutting plate 250 as shown in FIG. 4. The tip of the plunger 51a is fabricated from hard wear resistant material such as carbide; alternatively, this area can be coated with a hard wear resistant coating to improve the wear characteristics of the crimping and cutting portion of the device.

The crimping punch 50a slides over hole 70 in nose portion 46 when the punch is extended in the direction of the crimping position towards the distal opening in 46 to assist in the shearing action used to cut the free end of cable 20 away from the ferrule during crimping. As shown in cross section FIG. 4B, hole 70 in nose portion 46 forms a pocket angled toward the direction that the safety cable 20 will enter the device to facilitate the advancement of the safety cable through hole 70 during the drive stroke of the crimp punch 50. Crimping forces the ferrule 24 to be pushed through opening 46d in nose portion 46 as it is being forced out of the tool by the crimp punch 50 as shown in FIG. 4A. The relative movement as described above causes shearing of the cable 20 protruding through hole 70 on 46b by the plate 250. FIG. 4A. Specifically, a replaceable cutting plate 250 preferably made of hardened metal such as tool steel is provided at the bottom of opening 48 to improve the wear characteristics of the crimping and cutting portion of the tool. FIG. 4A. The plate 250 provides a sharpened edge against which the cable 20 is urged by ferrule 24 during crimping to thereby cause shearing of the cable adjacent the lower surface of the ferrule 24. FIG. 4B. The plate 250 may be constructed so as to be replaceable to increase service life of the tool.

In accordance with the embodiment of FIG. 4, the crimping punch 50a includes a flattened bottom section 5 lb that slides over plate 250 when the punch is extended towards the crimping position to assist in the shearing action used to cut the free end of cable 20 away from the ferrule during crimping. The crimping punch 50a, of course, is also located so as to be closely adjacent to the bottom of opening 48 next to the cutting plate 250 when the ferrule 24 is being deformed by restriction 46d by the urging of the crimping plunger. FIG. 4.

To ensure that the ferrule 24 is disposed contiguous with hole 70 in the nose portion 46 during crimping, the depth of opening 48 is selected such that the height of a ferrule 24 to be crimped by the tool is always slightly greater than the depth of the opening 48 to ensure that the ferrule, which is disposed between fastener 14 and plate 250, is pressed through restriction 46d when the tool is operated as shown in FIG. 4. The outer flange of the ferrule 24 is disposed in the opening shown in FIG. 4A and gently rests against the sides of the opening 48 in the elongated nose portion 46 before crimping. FIG. 4A.

An alternative embodiment of nose portion 46 allows for the nose piece to be removed and accepted by many different tool bodies. FIG. 5. For example, tool bodies operated manually, tool bodies operated electrically or by battery power, tool bodies operated by hydraulic means and tool bodies powered by pneumatic means.

Figure 12:
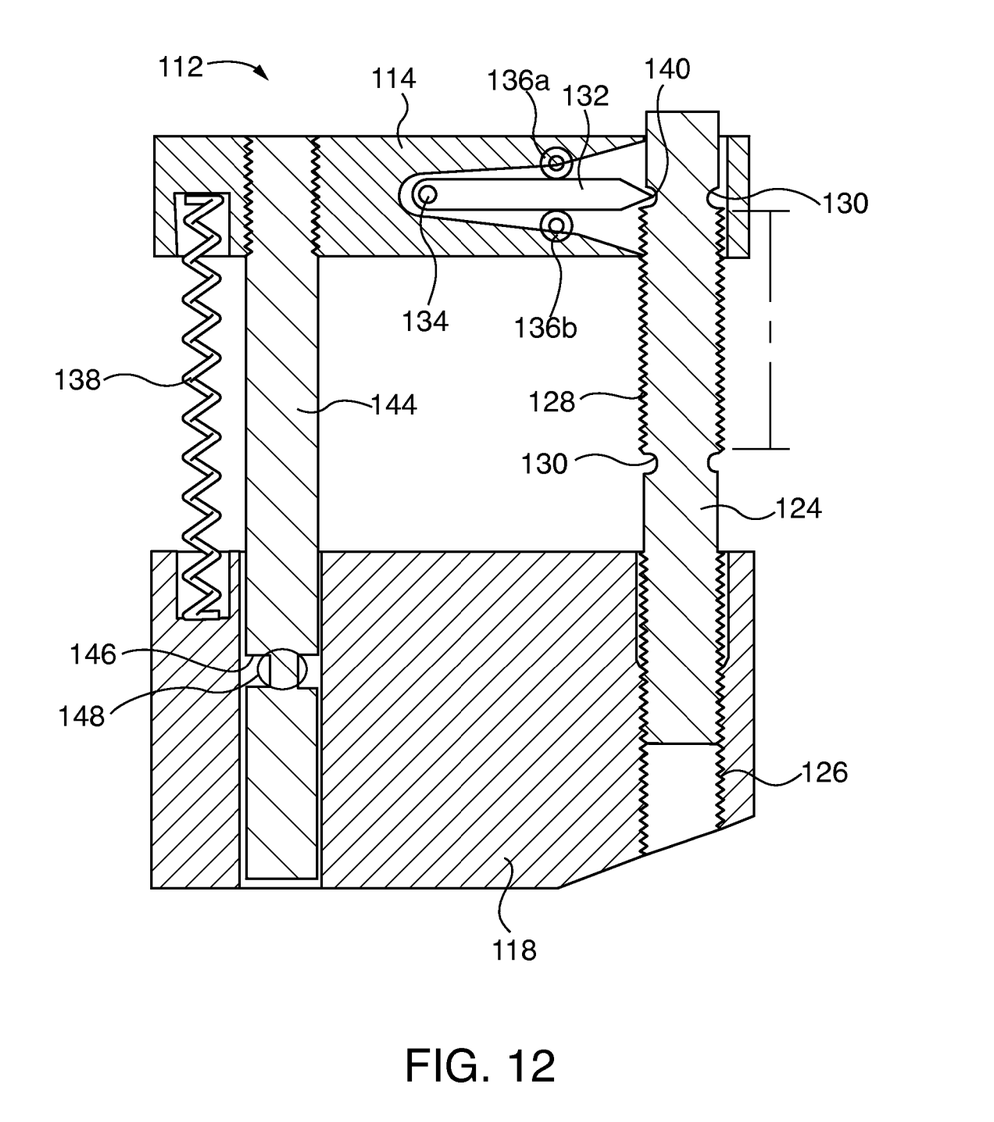
FIG. 12 is an enlarged planner view of the ratchet mechanism associated with device according to the present invention.

During the drive stroke of crimp punch 50, in order to prevent the movement of handle members 26 and 28 away from each other before the ferrule 24 has been permanently attached to the safety cable 20, ratchet mechanism 112 is provided. As best seen in FIGS. 6, 12 and 13A-14C, ratchet mechanism 112 comprises a ratchet body 114 attached to medihandle member 26 via pivot pin 116. It also comprises a support body 118 attached to handle member 28 via pivot pin 120. Ratchet member 124 is attached to the support body 118 via threads 126. Ratchet member 124 also extends through the ratchet body 114 and defines a plurality of ratchet teeth 128 extending over a length of the ratchet member 124. Ratchet member 124 also defines ratchet grooves 130 located at either end of the ratchet teeth 128. The depth of ratchet teeth 130 is greater than that of ratchet teeth 128 as illustrated in FIG. 12.

Pawl 132 is pivotally attached to ratchet body 114 via pivot pin 134. Resilient biasing members 136a and 136b are located on opposite sides of pawl 132 and exert a biasing force thereon urging it to the central position illustrated in FIG. 12. Compression spring 138 is operatively interposed between the ratchet body 114 and support body 118 so as to normally urge these elements apart.

Figure 13A:
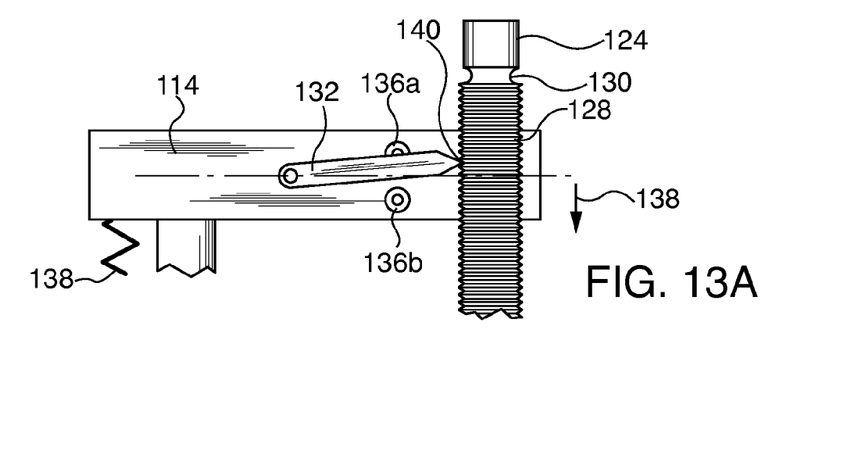
FIG. 13A-13C are views of the operation of the ratchet mechanism of the device according to the present invention.
Figure 13B:
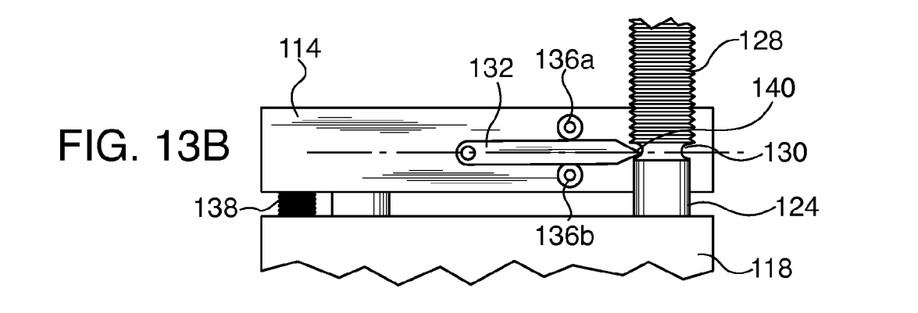
Figure 13C:
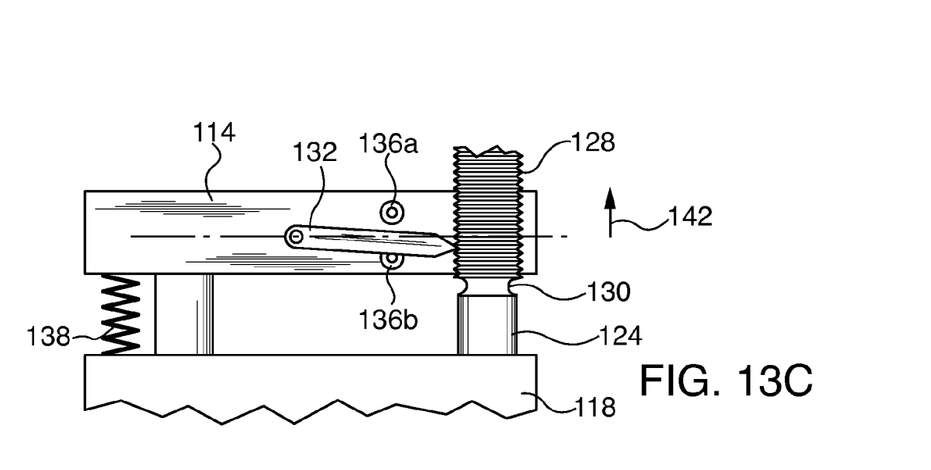

The operation of the ratchet mechanism can be seen from FIGS. 13A-13C. Movement of handle members 26 and 28 towards each other will cause ratchet body 114 and support body 118 to also move towards each other. Thus, ratchet body 114 moves in the direction of arrow 138 in FIG. 13A relative to ratchet member 124. Pawl 132 defines an engagement edge 140 which, when the ratchet body 114 is displaced towards support body 118, engages ratchet teeth 128. The movement of ratchet body 114 will cause pawl 132 to pivot about pivot pin 134 so as to compress resilient biasing member 136a. This compression will increase the force urging the pawl 132 toward its central position illustrated in FIG. 13. However, the depth of the ratchet teeth 128 is insufficient to allow the pawl 132 to return to this position.

Thus, once the engagement edge 140 engages ratchet teeth 128, it is impossible for ratchet body 114 to move in any direction other than that indicated by arrow 138 in FIG. 14A. This prevents the handles 26 and 28 from being moved apart as long as pawl 132 is engaged with ratchet teeth 138 to prevent partial crimping of a ferrule. Once the handles 26 and 28 have been moved towards each other sufficiently for the crimping punch 50 to have fully crimped the ferrule 24 onto the safety wire 20, the ratchet body 14 and the support body 118 will be in the positions illustrated in FIG. 13B. In this position, engagement edge 140 of pawl 132 enters the lower ratchet groove 130 which has a depth sufficient to allow the pawl 132 to be returned to its central position due to the biasing force of resilient biasing member 136a. FIG. 13B.

Once the engagement edge 140 enters the groove or ratchet tooth 130, ratchet 114 and support body 118 may move away from each other, as illustrated in FIG. 13C. Movement of ratchet body 114 relative to support body 118 in the direction of arrow 142 will bring engagement edge 140 once again into contact with ratchet teeth 128. The depth of the ratchet teeth 128 will cause the pawl 132 to pivot about pivot pin 134 and compress resilient biasing member 136b. This depth, however, is insufficient to allow the pawl 132 to return to its center position. This prevents movement of ratchet body 114 in any direction except that indicated by arrow 142. Once ratchet body 114 reaches the position illustrated in FIG. 12, the upper ratchet groove 130 will enable the pawl 132 to be returned to its center position by resilient biasing members 136a and 136b.

Those of ordinary skill in the art will recognize that the embodiments just described merely illustrate the principles of the present invention. Many obvious modifications may be made thereto without departing from the spirit or scope of the invention as set forth in the appended claims.

What is claimed is:

1. An adjustable shelf support locking system for a medicine cabinet with two generally parallel inner vertical walls or other type cabinet, comprising:

a shelf support locking member having an elongated rectangular body section with a plurality of attachment lugs standing off perpendicular from the elongate axis of the rectangular body section of the shelf support locking member for insertion into circular slots in the vertical inner wall of the cabinet;

a generally triangular section protruding from the side opposite the attachment lugs on the elongated rectangular body section containing a channel oriented to receive a shelf;

a recessed race formed in each of the inner vertical walls of the cabinet having circular slots formed in a recessed surface and evenly spaced in vertical orientation to accept a plurality of lugs protruding from the rectangular body section of the shelf support locking member;

the attachment lugs of the shelf support locking member inserted into and through the circular slots in the recessed race in the vertical wall of the cabinet so that the shelf support locking member lugs and rectangular body section can be slidingly engaged within the circular slots of the recessed races of the inner vertical wall of the cabinet and locked into place;

the shelf support locking members inserted in opposite positions to each other in the inner vertical walls of the cabinet so that the channel opening portion of the shelf support locking members is open to the front of the cabinet and together form an insert into which a shelf is inserted.

2. An adjustable shelf support locking system as set forth in claim 1, further comprising two lugs attached to the rectangular body.

3. The crimping device of claim 2, further comprising a means operatively associated with the handle element for preventing the ferrule crimping punch driving element from returning toward its retracted position until it has reached its crimping position after the crimping punch is moved initially toward its crimping position from its retracted position.

4. The crimping device of claim 3, wherein the elongated nose portion can be replaced and substituted onto alternate tool bodies.

5. An adjustable shelf support locking system as set forth in claim 1 or claim 2, further comprising a plurality of shelf receiving channels.

6. An elongated nose element removably attached to a tool body of a crimping device for assembling a ferrule onto a strand such as a wire or cable, comprising:

the elongated nose element comprising a proximal end defined such that the elongated nose element can be removed and replaced;

a ferrule crimping punch driving element extending axially along the elongated nose element operatively connected to a tool body to produce reciprocating motion of the driving element in the axial direction upon operation of the tool body from a retracted position to a crimping position;

the distal end of the elongated nose element comprising a ferrule receiving aperture defined by a shelf on which the outer flange of the ferrule is seated and through which a strand element passes generally transverse to an elongate direction of the nose portion, the nose portion further having a passageway extending from a proximal end of the nose portion in the elongate direction to an intersection with the ferrule receiving aperture;

the ferrule crimping punch driving element mounted in the passageway in the elongated nose element for reciprocating motion therein, from the retracted position to the crimping position, the crimping punch drive element extending axially into the ferrule receiving aperture upon outward reciprocating movement sufficient to cause crimping of the ferrule in the crimping position by pushing the ferrule and strand element running through the ferrule through a channel defined by a restriction at the distal end of the elongated nose element resulting in the ferrule being fixed to the strand element;

whereby the crimped ferrule and strand element is ejected from the device and any excess strand element protruding beyond the ferrule is removed and the driving element returns to the retracted position.

\* \* \* \* \*